United States Patent [19]

Morikawa et al.

[11] 4,313,649

[45] Feb. 2, 1982

[54] LENS ASSEMBLY

[75] Inventors: Teruo Morikawa, Sagamihara; Shinji Murata, Tokyo, both of Japan

[73] Assignee: Canon Kabushiki Kaisha, Tokyo, Japan

[21] Appl. No.: 109,276

[22] Filed: Jan. 3, 1980

[30] Foreign Application Priority Data

Jan. 17, 1979 [JP] Japan .................................. 54-4461

[51] Int. Cl.³ .......................... G02B 7/02; F16L 47/06
[52] U.S. Cl. .................................... 350/252; 285/396; 285/DIG. 22; 350/242
[58] Field of Search ...................... 350/252, 256–257, 350/242; 354/286; 339/61 R, 61 C, 61 L, 90 R, 90 CF; 285/396, DIG. 22; 403/289, 349

[56] References Cited

U.S. PATENT DOCUMENTS

| 870,535 | 11/1907 | Bausch | 350/253 |
| 2,820,655 | 1/1958 | Hileman | 285/DIG. 22 |
| 3,950,014 | 4/1976 | Doubleday | 285/DIG. 22 |

FOREIGN PATENT DOCUMENTS

| 2251776 | 6/1975 | France | 339/61 L |
| 19842 | of 1892 | United Kingdom | 350/257 |

Primary Examiner—William H. Punter
Attorney, Agent, or Firm—Fitzpatrick, Cella, Harper & Scinto

[57] ABSTRACT

A lens is fixed in a molded lens tube by a molded fastening ring. The fastening ring has a projection and the lens tube has a notch. The projection is elastically engaged in the notch so that the fastening ring is secured to the lens tube.

8 Claims, 3 Drawing Figures

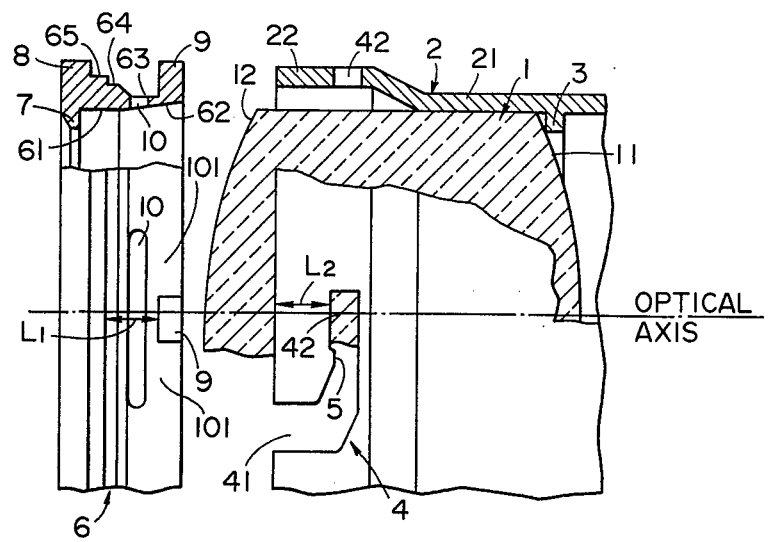
FIG. IA
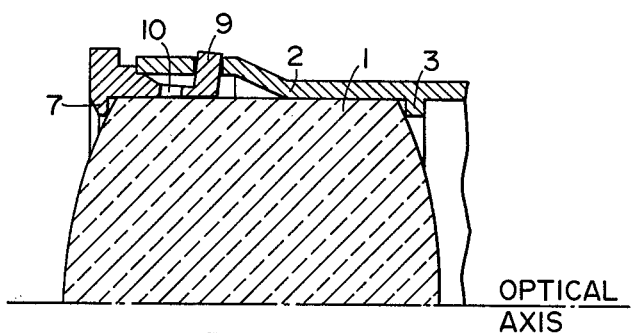
FIG. IB
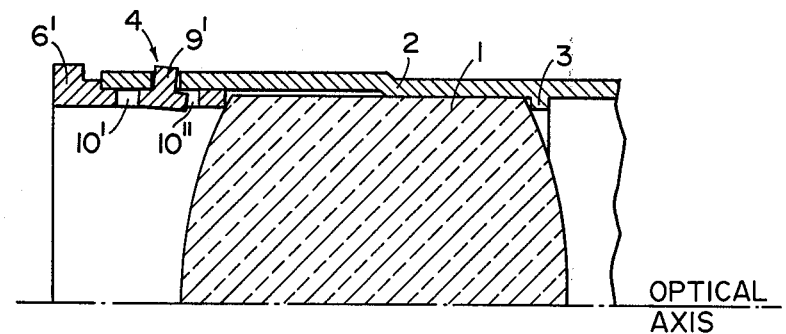
FIG. 2

LENS ASSEMBLY

BACKGROUND OF THE INVENTION

1. Field of the Invention

The present invention relates to a fixing mechanism for optical glass. More particularly, the invention relates to an optical glass fixing mechanism useful for fixing a lens in a lens tube.

2. Description of the Prior Art

Hitherto, various methods have been employed to fix an optical lens in a lens tube for use in an electrophotographic copying apparatus and other image forming apparatus. Among them it has been well known and widely used to fit a lens clamp ring in a lens tube by means of threads. On the other hand, at present, there is an increasing tendency to make lens tubes employing plastic molding techniques. The most important merit they aim at obtaining by it is, of course, a reduction in cost. However, in practice, no satisfactory cost reduction is attainable thereby so long as there is used the conventional lens fixing method mentioned above. The cost involved in dies and many steps required for assembly diminish the merit derivable from the use of a molding technique. In particular, as for female screw, a die for under-cutting is required which makes the structure of dies larger and complicate. The above problem of dies is also applied to another arrangement of lens assembly comprisng a lens tube having a simple inner circumferential slot and a lens clamp ring member fitted in the slot. As for the assembling steps, the number of steps necessary for assembly is increased when the above thread engagement method is employed to fix the lens in the lens tube. This is because the clamp ring has to be rotated several turns to firmly fasten the lens in the lens tube.

SUMMARY OF THE INVENTION

Accordingly, it is a general object of the present invention to eliminate the disadvantage of the prior art lens assembly mentioned above.

More specifically, it is an object of the invention to provide a lens assembly which can be manufactured employing a known molding technique and using very simple dies.

It is another object of the invention to provide such lens assembly which enables a lens to be fixed in the lens tube in a very simple manner, namely, in one touch fashion.

It is a further object of the invention to provide such lens assembly which never applies any unreasonable force to the lens in the lens tube and which allows easy disassembly at any time for readjustment or for other purposes.

Other and further objects, features and advantages of the invention will appear more fully from the following description taken in connection with the accompanying drawings.

BRIEF DESCRIPTION OF THE DRAWINGS

FIG. 1(a) is a partial sectional view of the essential part of a lens assembly according to the invention, the assembly being shown in a position before the final step of assembly;

FIG. 1(b) shows the essential part of the assembly after assembly; and

FIG. 2 shows another embodiment of the invention.

DESCRIPTION OF THE PREFERRED EMBODIMENTS

In FIG. 1(a) is shown a preferred embodiment of the invention, a lens is designated by 1, a lens tube by 2 and a fastening ring by 6. In the position shown in FIG. 1(a), the lens 1 has already been inserted into the lens tube 2 and in positioned by an annular projection 3 provided on the inner surface of the lens tube. The rear surface 11 of the lens 1 is in contact with the annular projection 3 at its edge. The optical axis of the lens is coincident with the center axis of the lens tube.

At the portion 21 in which the rear part of the lens is inserted, the lens tube has an inner diameter approximately equal to the outer diameter of the lens so that the lens 1 is tightly fitted in the lens tube 2 by insertion.

At the front portion 22, the lens tube has a larger diameter than the outer diameter of the lens. Furthermore, at this front portion 22, the lens tube is cut out to form a slot 4. The slot 4 comprises a horizontal portion 41 where the slot extends in parallel with the center axis of the lens tube and a vertical portion 42 where the slot extends in the direction normal to the center axis, that is, in the direction along the circumference of the lens tube. A projection 5 is provided in the vertical portion 42 for the purpose of locking.

The lens fastening ring 6 to be fitted in the lens tube to fasten the lens 2 has a lens abutment portion 7, a hand grip portion 8, a projected portion 9 and a slot 10. The hand grip portion 8 gives a great convenience to the assembler. When assembled, the lens 2 abuts against the abutment portion 7 at the edge of the lens front surface 12. The slot 10 is adjacent to the foot of the projection 9 and extends in the direction normal to the center axis of the ring, that is, in the direction along the circumference of the ring. The inner diameter of the ring 6 is approximately equal to the outer diameter of the lens 2 at the front portion 61 of the ring and slightly larger than the outer diameter of the lens at the rear portion 62 in which the projection 9 is provided. At the rear portion 62, the inner surface of the ring is so tapered or stepped as to gradually increase the ring inner diameter outwards. At the base portion 63 of the projection 9 the outer diameter of the ring is smaller than the inner diameter of the lens tube at its front portion 22. At the portion 64 in front of the slot 10 the outer diameter of the ring is nearly equal to the inner diameter of the front portion of the lens tube. Therefore, no play of the ring is allowable in the lens tube. At the portion 65 the outer diameter of the ring is larger than the inner diameter of the front portion 22 of the lens tube. The stepped surface between the portions 64 and 65 is used to position the ring relative to the lens tube. When the ring is fitted in the lens tube, the vertical face of the stepped surface abuts against the front end surface of the lens tube. The distance $L_1$ between the abutment face of the stepped portion which defines a predetermined reference and the inner side face of the projection 9 is so measured as to be a little smaller than the distance $L_2$ between the front end surface of the lens tube or predetermined reference when assembled and the inner side face of the vertical portion 42 of the slot 4.

The fastening ring 6 is inserted into the lens tube 2 with the projection 9 of the former being fitted in the horizontal portion 41 of the L-shaped slot 4. Then, the ring is rotated with the projection 9 being fitted in the vertical portion 42 of the slot 4. Thus, the lens 1 is firmly fixed in the lens tube. This position is shown in FIG.

1(b). The locking projection or shoulder 5 prevents the ring 6 from turning back and slipping out from the lens tube.

Since, as previously noted, the distance $L_1$ is a little shorter than $L_2$, the portion 101 surrounding the slot 10 at the side of projection 9 is elastically deformed when the lens fastening ring 6 and the lens tube 2 are assembled together in the manner described above. This elastic deformation of the portion 101 produces a clamping force exerting on the lens 1. In other words, the projection 9 is elastically pressed against the inner surface of the vertical portion 42 of the slot 4. To accommodate such elastic deformation, the inner diameter of the ring at its portions 62 and 63 is so measured as to be smaller than the outer diameter of the front portion of the lens and is gradually changed in a form of taper or step as described above.

The lens tube 2 is a molded good made of a mixture of glass fiber and a plastic such as polycarbonate, an aluminum alloy or other suitable material which can give the advantage of high accuracy in shape. The lens fastening ring 6 is a molded good made of elastically deformable plastic material such as acetal resin, various copolymer resins or composite materials which are elastically deformable but less creep deformable.

FIG. 2 illustrates another embodiment of the invention. Like the first embodiment, the lens assembly shown in FIG. 2 is featured by the structure of a lens fastening ring 6'. The ring 6' has two slots 10' and 10" disposed opposed to each other relative to a projection 9'. The projection 9' is engaged in the slot 4 in such manner as to fix the fastening ring 6' to the lens tube 2 as well as to clamp the lens 1 relative to the lens tube by the rear end surface of the ring 6'.

As a modification of the above embodiments, the projection 9 or 9' may be provided on the lens tube 2 while providing the slot 4 in the lens fastening ring 6 or 6'. This modification will be well understood by regarding the member 2 in FIGS. 1(a) and 1(b) as lens fastening ring and 6,6' as lens tube.

The slot 4 has been shown to be a L-shaped slot. But, the slot may be of J-form or of straight line form extending in the direction inclined to the optical axis of the lens.

Preferably, two or more projections 9 or 9' and the corresponding number of slots 4 are provided along the circumference of the lens assembly.

While the invention has been particularly shown and described with reference to preferred embodiments thereof, it will be understood by those skilled in the art that foregoing and other changes in form and details can be made therein without departing from the spirit and scope of the invention.

What we claim is:

1. A lens assembly comprising:
    a lens;
    a cylindrical lens tube member for accommodating said lens, said tube member having a positioning surface for bearing against and positioning one end of said lens; and
    a fastening member, engageable with said tube member, for bearing against the other end of said lens, one of said tube and fastening members having a slot which extends at least in part in a direction transverse to the optical axis of said lens, and the other member having a corresponding projection engageable with said slot, one of said members having a resiliently deformable portion, wherein when said projection is in engagement with said slot the distance from a predetermined reference to the portion of said projection which engages said slot, and the distance from the predetermined reference to the portion of the inside surface of the slot are so related that said resiliently deformable portion is resiliently deformed to resiliently urge said projection toward a portion of the inside surface of said slot which extends in a direction transverse to the optical axis.

2. A lens assembly according to claim 1 wherein said resiliently deformable portion has an elongate opening.

3. A lens assembly according to claim 1 or 2 wherein said projection containing member has a tapered surface at the inner diameter side of said projection.

4. A lens assembly according to claim 1 or 2 wherein said fastening member is of molded plastic.

5. A lens assembly according to claim 4 wherein said lens tube member is of molded plastic.

6. A lens assembly according to claim 1 or 2 wherein said projection containing member has a stepped surface at the inner diameter side of said projection.

7. A lens assembly according to claim 1, wherein said slot includes a guide portion for guiding said projection into the perpendicularly extending portion thereof.

8. A lens assembly according to claim 1, wherein said one member has a plurality of slots and said other member has a corresponding number of projections and deformable portions.

* * * * *